United States Patent
Janakiraman et al.

(10) Patent No.: US 11,058,095 B2
(45) Date of Patent: Jul. 13, 2021

(54) WORKING ANIMAL REACTION HANDLING

(71) Applicant: INTERNATIONAL BUSINESS MACHINES CORPORATION, Armonk, NY (US)

(72) Inventors: Janani Janakiraman, Austin, TX (US); Anna Astakhishvili, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 241 days.

(21) Appl. No.: 16/043,961

(22) Filed: Jul. 24, 2018

(65) Prior Publication Data
US 2020/0029532 A1   Jan. 30, 2020

(51) Int. Cl.
*A01K 15/02* (2006.01)
*G06T 7/73* (2017.01)
*A01K 29/00* (2006.01)
*G06K 9/00* (2006.01)
*A61H 3/06* (2006.01)

(52) U.S. Cl.
CPC ............ *A01K 15/02* (2013.01); *A01K 29/005* (2013.01); *A61H 3/061* (2013.01); *G06K 9/00369* (2013.01); *G06T 7/73* (2017.01); *A61H 2201/5058* (2013.01); *A61H 2201/5097* (2013.01)

(58) Field of Classification Search
CPC .... A01K 15/02; A01K 15/021; A01K 29/005; A01K 15/00; A61H 3/061; A61H 2003/063
See application file for complete search history.

(56) References Cited

U.S. PATENT DOCUMENTS

| | | |
|---|---|---|
| 7,230,538 B2 | 6/2007 | Lai et al. |
| 9,004,016 B2 | 4/2015 | Stratton et al. |
| 9,510,993 B2 | 12/2016 | Te |

(Continued)

FOREIGN PATENT DOCUMENTS

| | | | | |
|---|---|---|---|---|
| CN | 101273948 A | 10/2008 | | |
| WO | WO-2018116221 A1 | * | 6/2018 | ........... A01K 29/005 |
| WO | WO-2019010494 A1 | * | 1/2019 | ........... A01K 15/021 |

OTHER PUBLICATIONS

Y. Takeuchi, et al., "An approach to canine behavioural genetics employing guide dogs for the blind", 2009 International Society for Animal Genetics, Animal Genetics, vol. 40, No. 2, pp. 217-224.

(Continued)

*Primary Examiner* — Kristen C Hayes
(74) *Attorney, Agent, or Firm* — Noah Sharkhan; Matthew M. Hulihan; Heslin Rothenberg Farley & Mesiti PC

(57) ABSTRACT

A working animal reaction handling method monitors reactions of a working animal in an environment to conditions of that environment. The method uses an imaging device to obtain images of the environment, the images providing at least a portion of environmental data about the environment. The method ascertains, based at least in part on the environmental data, a cause of a reaction, of the monitored reactions, of the working animal, electronically signals a handler of the working animal with an alert about the ascertained cause of the reaction of the working animal.

20 Claims, 5 Drawing Sheets

(56) References Cited

U.S. PATENT DOCUMENTS

| | | |
|---|---|---|
| 2013/0258078 A1 | 10/2013 | Huang et al. |
| 2014/0069351 A1 | 3/2014 | Stratton et al. |
| 2016/0030275 A1 | 2/2016 | Liang et al. |
| 2017/0081027 A1* | 3/2017 | Bivens .................. B64D 47/08 |
| 2017/0238509 A1* | 8/2017 | Dayal .................... A61H 3/061 |
| 2017/0272843 A1* | 9/2017 | Dror ....................... G06F 19/00 |
| 2017/0307719 A1 | 10/2017 | Said |
| 2017/0332601 A1* | 11/2017 | Brown ............... H04N 5/23296 |
| 2017/0372583 A1* | 12/2017 | Lamkin ................ A01K 29/005 |
| 2018/0014512 A1* | 1/2018 | Arabani ................. H04N 7/185 |
| 2018/0218057 A1* | 8/2018 | Beckham ............... G06Q 50/02 |
| 2018/0263220 A1* | 9/2018 | Schab .................. G08B 21/182 |
| 2019/0183092 A1* | 6/2019 | Couse .................. A01K 11/006 |

OTHER PUBLICATIONS

Mell, Peter, et al., "The NIST Definition of Cloud Computing", NIST Special Publication 800-145, Sep. 2011, Gaithersburg, MD, 7 pgs.

* cited by examiner

WORKING ANIMAL REACTION HANDLING

BACKGROUND

Guide dogs and service animals can be an important asset to their handlers, often times being trained to take cues from the handler and help the handler perform tasks. Such animals are put through a rigorous training regimen that, in part, trains the animal on avoiding distractions (such as cats). However, approaches for animal reaction handling, either during training or in actual service, can be improved.

SUMMARY

Shortcomings of the prior art are overcome and additional advantages are provided through the provision of a computer-implemented method. The method monitors reactions of a working animal in an environment to conditions of that environment. The method uses an imaging device to obtain images of the environment. The images provide at least a portion of environmental data about the environment. The method ascertains, based at least in part on the environmental data, a cause of a reaction, of the monitored reactions, of the working animal. The method also electronically signals a handler of the working animal with an alert about the ascertained cause of the reaction of the working animal.

Further, a computer system is provided that includes a memory and a processor in communication with the memory. The computer system is configured to perform a method. The method monitors reactions of a working animal in an environment to conditions of that environment. The method uses an imaging device to obtain images of the environment. The images provide at least a portion of environmental data about the environment. The method ascertains, based at least in part on the environmental data, a cause of a reaction, of the monitored reactions, of the working animal. The method also electronically signals a handler of the working animal with an alert about the ascertained cause of the reaction of the working animal.

Yet further, a computer program product including a computer readable storage medium readable by a processing circuit and storing instructions for execution by the processing circuit is provided for performing a method. The method monitors reactions of a working animal in an environment to conditions of that environment. The method uses an imaging device to obtain images of the environment. The images provide at least a portion of environmental data about the environment. The method ascertains, based at least in part on the environmental data, a cause of a reaction, of the monitored reactions, of the working animal. The method also electronically signals a handler of the working animal with an alert about the ascertained cause of the reaction of the working animal.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
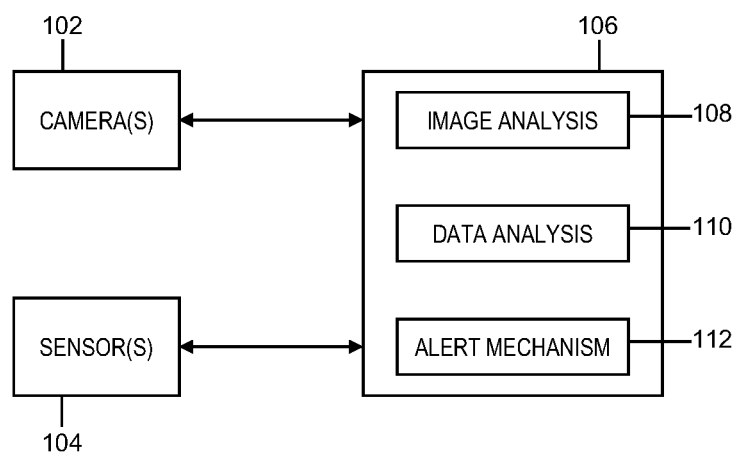
FIG. 1 depicts an example environment to incorporate and use aspects described herein.

Described herein are approaches for working animal reaction handling. Aspects are presented in the context of a guide dog, however these are by way of example only; concepts and aspects described herein apply to any type of working animal. Example types of working animals include service/assistance animals (such as but not limited to guide dogs, medical alert animals, psychiatric assistance dogs, seizure dogs, or the like), comfort animals, and law enforcement animals (e.g. "police dogs"), among other types. The foregoing animals are collectively referred to herein as "working animals".

Aspects monitor a working animal's (such as a guide dog's) reactions, leverage cameras and/or environmental sensors to scan the environment, analyze acquired data to ascertain a cause of the animal's reaction, and signal a handler accordingly. Some reactions are legitimate signals to the handler about specific task(s) that the working animal has been trained to provide, for instance when a guide dog lightly pulls its handler in a particular direction to avoid an obstacle. In some examples, the reaction is classified as a distraction and this information is provided to the handler. This can be used during the training process when a handler is getting used to the animal and/or on a continuous basis as the animal is in service.

When guide dogs become excited or distracted, the handler may not be aware of the reason for the reaction. The lack of information gives the handlers lack of control, which can be unnerving. Training is not perfect, and therefore false signals of danger or other incorrect signals (such as pulling the handler in a wrong direction) can result.

Aspects described herein differ from approaches that merely leverage a camera to discern dangers in surroundings. For instance, aspects described herein can assist handlers by providing information of the reason why the working animal may have had an observed reaction. When the handler is made aware of whether/why the animal has had a particular reaction, the handler has a better understanding of whether the reaction is a false positive alert. This can facilitate proper training of the animal, for instance by providing tactile feedback to the handler so that the handler can take corrective actions, for instance to hold the leash more firmly, as a way of helping to train the animal against such false positives. Additionally, this information can help a handler of the animal when in service because the handler can be made aware whether the reaction is a legitimate signal or instead a distraction of the animal.

As noted, aspects described herein monitor the reactions of a guide dog (as one example of a working animal), leverage a camera to scan the surroundings, and analyze data to determine the cause of the dog's reaction. This information can be provided to the handler as an alert. Alerts can be used by the handler to send additional cues to the guide dog in cases where the handler determines that the dog is distracted. This can be used during the training phase, in some embodiments, when a handler is getting used to a dog and/or on a continuous basis.

For instance, some embodiments sense the dog's reaction to environmental conditions or stimuli. Example conditions include people, scenes, objects, noises, smells, colors, or any other environmental condition that can be observed and/or stimulate a reaction. The reactions can be monitored to determine whether to trigger reaction processing. For instance, the monitoring might sense that the dog is in an excited or alerted state, which may manifest itself through physiological indicators of the animal, as an example.

If the dog is determined to be experiencing a reaction to something, a process can scan the surroundings to ascertain what may be causing the reaction. In some examples, a video stream is captured and/or other environmental data is acquired, e.g. on a continuous or periodic basis, to acquire environmental data of the environment local to the animal. Upon sensing a reaction of a particular threshold or heightened state, acquired environmental data may be analyzed to ascertain what may be causing the reaction. Then, for instance if the reaction is classified as a distraction, the handler can be alerted about possible cause(s) of the distraction, and use that information for training purposes and/or to counter-react.

FIG. 1 depicts an example environment to incorporate and use aspects described herein. The environment includes computer system(s) 106 in data communication with camera(s) 102 and sensor(s) 104. Communication between the devices takes place via wired and/or wireless communications links for communicating data between the devices. Example such wireless communications links include wireless network communication links (e.g. Wi-Fi) or short-range wireless communication links, for instance those based on Bluetooth or other near/short range communication protocols Sensor(s) 104 may be disposed in, on, or adjacent to the working animal. In a particular example, one or more sensors are disposed on a jacket or other article worn by the animal. Sensor(s) 104 may be any desired type of sensor, examples of which include microphones, Global Positioning System (GPS) devices, cameras, accelerometers, gyroscopes, devices configured to sense/monitor light, proximity, heart rate, body and/or ambient temperature, blood pressure, and activity monitors, as examples. Generally, sensor(s) 104 may be any device that can acquire and provide information/data to monitor and/or sense reactions that the animal has to environmental stimuli.

Physiological data, such as the observation of sudden spikes in the animal's heartrate can signify excitement/reaction/distraction from something. In addition, audio sensors can capture/filter barks or other sounds made by the animal as a way of sensing reactions. In a particular example, this information is fed into a "reaction sensor" module (e.g. software), such as software being run on computer system(s) 106.

Computer system(s) 106 could be (i) one or more local computer system(s), (ii) one or more remote computer system(s) (e.g. remote from the working animal and handler), or (iii) a combination of local and remote computer system(s). Software configured to perform aspects described herein, for instance reaction sensing, image analysis, data analysis, alert processing, or the like, may be executing, in whole or in part, locally (e.g. on a user's smartphone or other mobile device(s), or a computer system built into a vest or other gear attached to the animal) and/or remotely (e.g. on a backend server, such as a cloud server). In some examples, one or more such computer systems incorporate one or more sensor(s) 104 and/or one or more camera(s) 102. For example, the handler may be wearing a head-mounted wearable smart glasses that incorporate camera(s), a microphone, and GPS component as sensors, and perform some or all processing described herein. As another example, the handler's smartphone might provide processing capability, while sensor(s) installed on/with the working animal and/or handler provide environmental data to the smartphone for processing. As yet another example, the handler's smartphone provides data via its cellular or Wi-Fi connection to a backend facility across a Wide Area Network for processing.

Computer system(s) 106 include image analysis component (108), data analysis component (110) and alert mechanism component (112), which, as noted, may each be hosted wholly or in part on one or more computer systems.

Image Analysis module/software (108) performs image analysis processing on images of the environment in which working animal is present. 'Environment' refers to the surroundings of the animal. If the animal is on a public street, the camera images would typically be at least images of what the animal sees in its field of view, though they may include other images, such as images of what is behind and above the animal, as examples. The images are acquired by one or more cameras, for instance one or more of which are attached to the animal or the handler. Example cameras include but are not limited to body cameras, vest-mounted cameras, and cameras incorporated into head-mounted wearable devices. In some embodiments, the cameras may be other than those attached to the animal or the handler, such as public street cameras or security cameras.

Image analysis may be used to identify objects, people, etc. in the environment, as this may inform about the cause of the animal's reaction. In particular examples, the image analysis identifies whether there are any other nearby animals, and if so which kinds of animals. By way of specific example, assume the working animal is a full-sized Labrador. In one scenario, the image analysis identifies a very small 'toy'-size dog in front of the Labrador. It may be known that the Labrador is extremely frightened by toy dogs, thus explaining a severe frightened reaction observed in the animal. In another scenario, the image analysis identifies a second Labrador in the environment, which explains an extremely excited reaction that was sensed from the working animal Labrador.

In some embodiments, the image analysis leverages facial recognition technology to identify a level of familiarity between the working animal and people present. The working animal may react very poorly to strangers, or perhaps very excitedly to particular people, thus causing heightened reactions and throwing false positive cues to the handler.

The image analysis can determine other details about the people in the images—whether they are girls, boys, kids, men, women, etc. It might identify whether there is anything unusual or specific about the particular people, for instance whether there is facial hair on men (e.g. if it is known the working animal becomes distracted by men with facial hair).

The image analysis can identify objects in the images—for instance a street grate or sewer drain that the animal is scared to pass, other animals (e.g. birds) nearby, and the like.

In general, the image analysis can look for any stimuli that might affect the working animal in ways to cause the observed reactions. In this regard, computer system(s) 106 may host and/or access animal-specific profiles having profile information applicable to the particular animal. Profiles of working animals can be maintained. Specific working animals can be associated with a profile specific to that working animal that includes characteristics (tendencies, classifications, physiological data baselines, etc.) of the working animal, and that information may be used in the ascertaining of causes of reactions that the animal has.

An animal's profile may include voice sample(s)/characteristics of the animal. Working animals are usually trained not to bark, growl, etc., or do so only in very specific circumstances. However, the animal might vocalize if triggered, and the voice sample can help identify whether captured audio is of the animal or something else in the environment.

A profile can include images of individuals' faces, for instance those people who might cause a heightened reaction in the animal, for instance a former trainer, the handler, or a person who was previously aggressive toward the animal, as examples. Thus, the profile can include image data of environmental objects (i.e. pictures of people's faces, etc.) with which the working animal or handler are familiar.

The profile can include baseline physiological information about the animal, for instance heartrate, blood pressure, and temperature information. These may be important parameters in the assessment about whether the animal is experiencing a reaction to something. Monitoring for reactions of the working animal can include capturing physiological data of the working animal from the sensors attached to the working animal, and identifying the reaction, i.e. identifying that the animal is currently reacting to something, based on a comparison of the baseline physiological data to the captured physiological data.

Accordingly, the profile can include a history of the animal, such as information indicating behavioral tendencies of the animal when the working animal encounters particular environmental objects, common reactions, unusual stimuli, and so forth. It is also noted that these indicators can be learned over time with respect to the particular animal. Since environmental data is captured as reactions are sensed, and feedback as to whether a reaction was a distraction (i.e. the animal was distracted) rather than a legitimate signal to the handler can be associated with the gathered data of each reaction. A classification model can be built that classifies the working animal's reactions to various environmental scenarios, e.g. classifies them as either a distraction or a legitimate alert/guidance to the handler. The classification model may be included in the profile and rapidly applied to acquired data (e.g. by a local computer system such as a mobile device) to classify the reaction.

Analysis of the animal's reactions and processing to ascertain a cause of a reaction may be performed by the data analysis module 110. Analysis can be done over a duration of time to analyze/determined correlation of the animal's reaction to objects found by, e.g., the image analysis module or from other environmental data, such as audio data of the environment. A determination can then be made about a possible cause of a distraction for the animal.

In a particular example, the analysis makes a binary determination (e.g. yes/no) as to whether a particular reaction is a distraction (i.e. the animal is in a state of being distracted, as opposed to exhibiting a legitimate alert to the handler), based on a confidence in that classification of the reaction as a distraction. In this regard, there may be a threshold that the handler, an administrator, or other user can set for triggering a 'distraction' (false positive) notification to the handler. If the reaction is sensed not to be a false positive, e.g. confidence that the reaction was a distraction is below the threshold, then in some embodiments no interference or alert by the computer system(s) 106 is delivered to the handler. In other examples, an alert of a reaction is provided, but the alert indicates that he reaction was not a distraction.

Based on an ascertained cause of a reaction by the animal, if the reaction of the working animal is ascertained to be a distraction of the working animal rather than a legitimate signal to the handler about a specific task that the working animal has been trained to provide, an alert can be selected to convey to the handler that the reaction of the working animal is a distraction, i.e. the reaction is a state of the animal being distracted. The alert mechanism 112 can provide such an alert. Alerts can be provided to the handler with additional information about the cause of a distraction for the animal. Alerts can be a various granularity—for instance an 'up/down' signal (audio, tactile, etc.) telling the handler whether to ignore the dog's reaction. Additionally or alternatively, alerts can be a spoken sentence with details of the situation delivered using a speaker, headphones, etc.

A tactile alert could be delivered to a point on the handler's hand that is holding the leash, for instance. This way, the handler can be aware to hold the animal's leash more sternly, in case there is a distraction and a potential case where the animal might want to lean in or move in the direction of the distraction.

As noted, various analyses may be performed locally and/or or on backend as a service. A potential advantage of performing analysis remotely is to aggregate reaction information (indications of environmental conditions or data with the reactions experienced and details of the particular animals experiencing the reactions) from multiple animals. This might inform, via machine leaning, as to common situations and highlight the types of objects that are statistically more likely to cause distractions to working animals. Though animals are unique like people, certain similarities/tends may be identified across samples. This can help train model(s) and improve reaction handling/classification.

Figure 2:
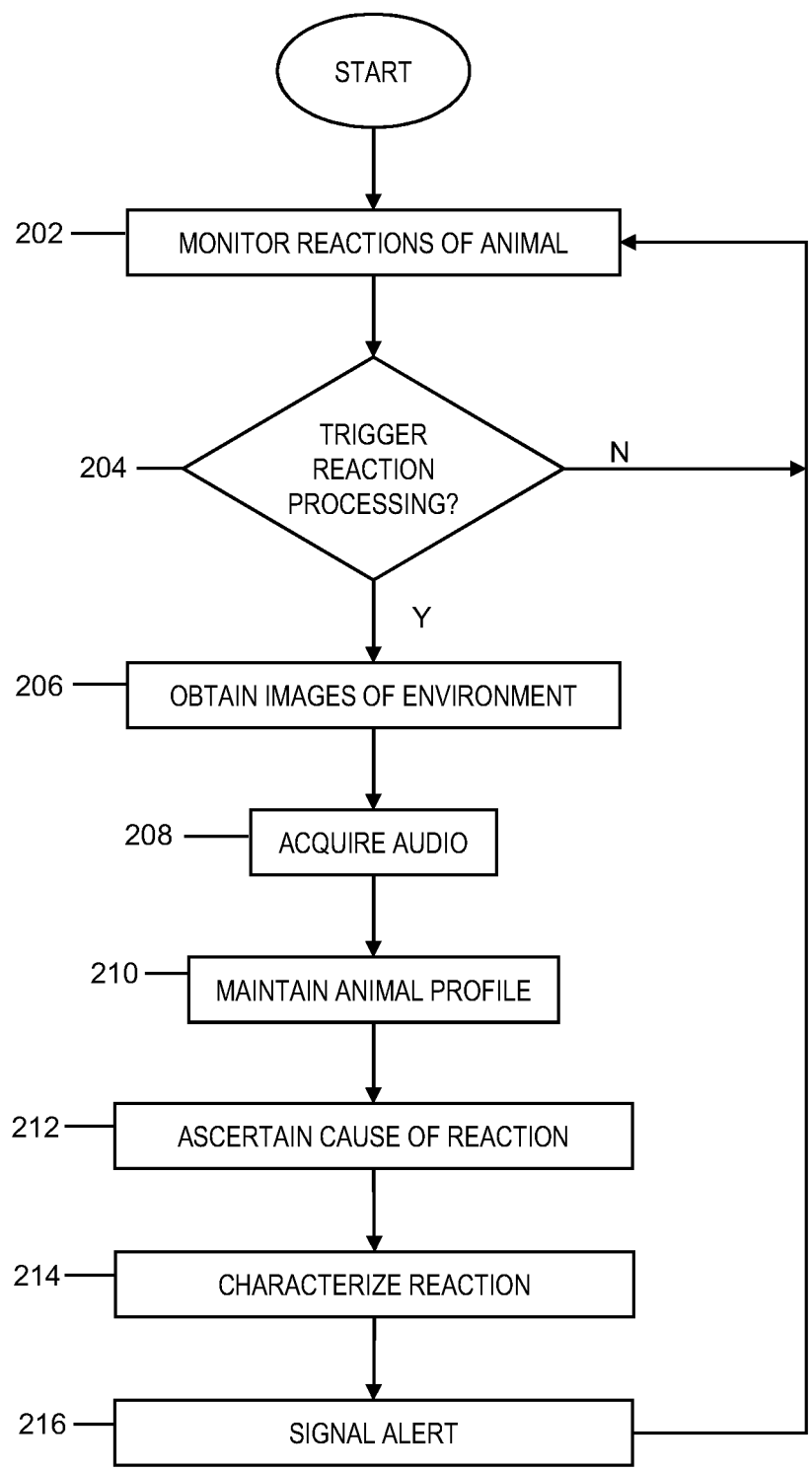
FIG. 2 depicts an example process for working animal reaction handling, in accordance with aspects described herein.

FIG. 2 depicts an example process for working animal reaction handling, in accordance with aspects described herein. In some examples, the process is performed by one or more computer systems, such as those described herein, which may include one or more computer mobile or wearable devices of an animal handler, one or more cloud/remote/backend servers, and/or one or more other computer systems.

The process includes monitoring reactions of a working animal (202) in an environment to conditions of that environment. 'Working animal' broadly captures many types of animals, including but not limited to service animals, assistance animals, comfort animals, and police dogs. Conditions of an environment refers to anything the animal encounters, such as (but not limited to) people, objects, noises, and smells.

The process monitors reactions (202) and determines whether to trigger reaction processing (204). Reaction processing 204 is, in some examples, not triggered for every sensed reaction of the animal. For instance, it may be triggered for reactions that exceed some threshold in terms of their intensity. Such a reaction may be informed by, as an example, physiological factors, such as a heartrate or the animal. Other reactions may be immediately recognizable as legitimate reactions, for instance if excitement is sensed in the animal when the animal arrives back home.

Monitoring (202) continues until it is determined to trigger reaction processing (204, Y). Upon triggering such processing, the process uses an imaging device to obtain images of the environment (206), and the images provide at least a portion of environmental data about the environment.

Environmental data can include any data collected about the environment, for instance images, audio, temperature, and so on. Thus, the process in this example also acquires audio (208) from the environment and provide the audio as part of the environmental data upon which the cause of the reaction is ascertained (see below).

Meanwhile, the process also maintains a profile of the working animal (210), the profile being specific to the working animal and including characteristics of the working animal that are used to ascertain the cause of the reaction (212). In a particular example, the profile indicates vocal characteristics of the working animal and image data of environmental objects with which the working animal or handler are familiar. Additionally or alternatively, the profile indicates behavioral tendencies of the working animal when the working animal encounters particular environmental objects.

In some examples, the profile includes baseline physiological data of the working animal, and the monitoring the reactions of the working animal (202) includes capturing physiological data of the working animal from sensors attached to the working animal, and identifying the reaction to trigger processing based on a comparison of the baseline physiological data to the captured physiological data.

In yet further examples, a classification model is built that classifies the working animal's reactions to various environmental scenarios, and this classification model is included in the profile.

In any case, the process continues by ascertaining, based at least in part on the environmental data, a cause of a reaction, of the monitored reactions, of the working animal (212). The process then characterizes, based on the ascertained cause of the reaction, the reaction of the working animal (214).

In an example, the characterizing (214) characterizes the reaction as a distraction of the working animal (state of the working animal being distracted) rather than a legitimate signal to the handler about a specific task that the working animal has been trained to provide.

The process also electronically signals a handler of the working animal with an alert (216) about the ascertained cause of the reaction of the working animal. The alert may convey what the cause was ascertained to be (e.g. without an indication of whether the cause is a distraction, while other types of alerts may indicate whether reaction is determined to be a distraction. Thus, the alert may be an audio alert describing the ascertained cause of the reaction. Additionally or alternatively, an alert is a tactile alert provided to the handler and indicating whether the reaction is characterized as a distraction of the working animal. In some examples, the alert signals the handler to ignore the reaction.

Aspects of the process of FIG. 2, for instance the monitoring the reactions, using the imaging device, assessing the cause of the reaction, and the signaling, may be performed during a training process to train the working animal.

Although various examples are provided, variations are possible without departing from a spirit of the claimed aspects.

Figure 3:
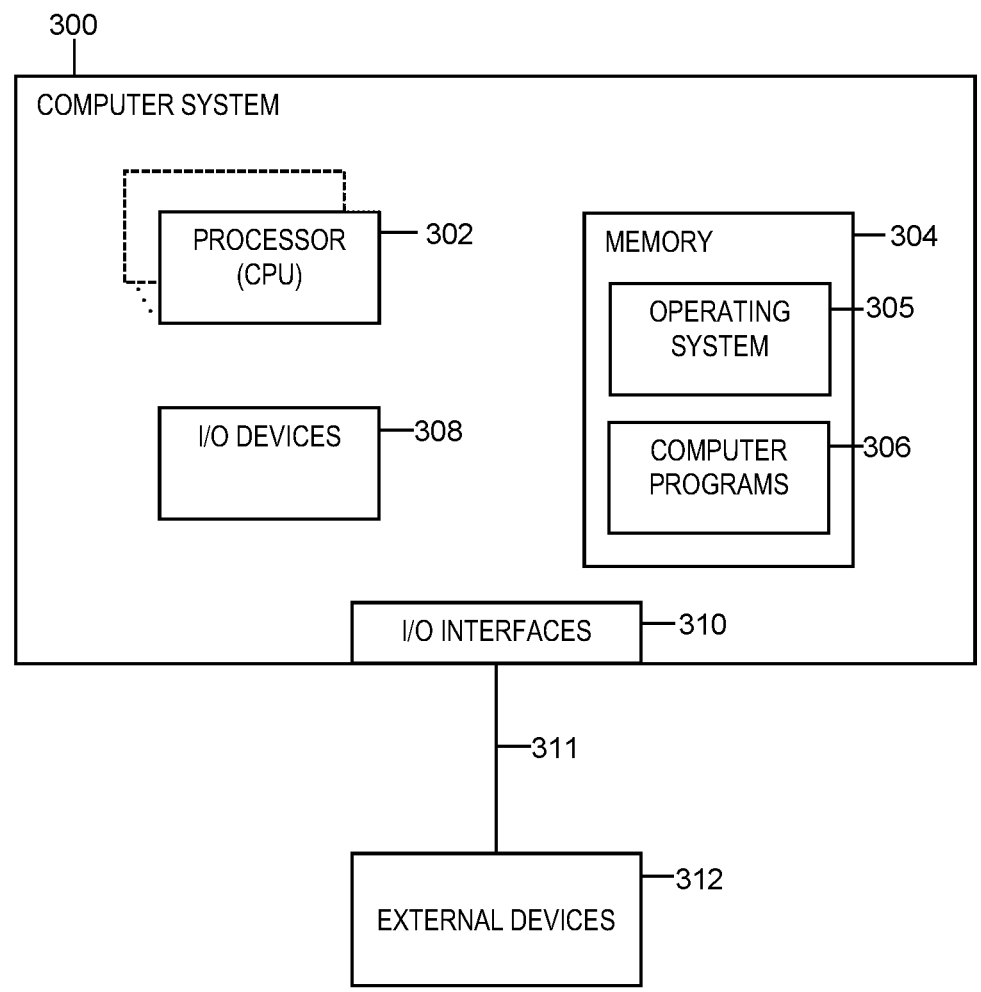
FIG. 3 depicts one example of a computer system and associated devices to incorporate and/or use aspects described herein.

Processes described herein may be performed singly or collectively by one or more computer systems, such as those described herein. FIG. 3 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 3 shows a computer system 300 in communication with external device(s) 312. Computer system 300 includes one or more processor(s) 302, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 302 can also include register(s) to be used by one or more of the functional components. Computer system 300 also includes memory 304, input/output (I/O) devices 308, and I/O interfaces 310, which may be coupled to processor(s) 302 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 304 can be or include main or system memory (e.g. Random Access Memory) used in the execution of program instructions, storage device(s) such as hard drive(s), flash media, or optical media as examples, and/or cache memory, as examples. Memory 304 can include, for instance, a cache, such as a shared cache, which may be coupled to local caches (examples include L1 cache, L2 cache, etc.) of processor(s) 302. Additionally, memory 304 may be or include at least one computer program product having a set (e.g., at least one) of program modules, instructions, code or the like that is/are configured to carry out functions of embodiments described herein when executed by one or more processors.

Memory 304 can store an operating system 305 and other computer programs 306, such as one or more computer programs/applications that execute to perform aspects described herein. Specifically, programs/applications can include computer readable program instructions that may be configured to carry out functions of embodiments of aspects described herein.

Examples of I/O devices 308 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (312) coupled to the computer system through one or more I/O interfaces 310.

Computer system 300 may communicate with one or more external devices 312 via one or more I/O interfaces 310. Example external devices include a keyboard, a pointing device, a display, and/or any other devices that enable a user to interact with computer system 300. Other example external devices include any device that enables computer system 300 to communicate with one or more other computing systems or peripheral devices such as a printer. A network interface/adapter is an example I/O interface that enables computer system 300 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 310 and external devices 312 can occur across wired and/or wireless communications link(s) 311, such as Ethernet-based wired or wireless connections. Example wireless connections include cellular, Wi-Fi, Bluetooth®, proximity-based, near-field, or other types of wireless connections. More generally, communications link(s) 311 may be any appropriate wireless and/or wired communication link(s) for communicating data.

Particular external device(s) 312 may include one or more data storage devices, which may store one or more programs, one or more computer readable program instructions, and/or data, etc. Computer system 300 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 300 may be operational with numerous other general purpose or special purpose computing system environments or configurations. Computer system 300 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
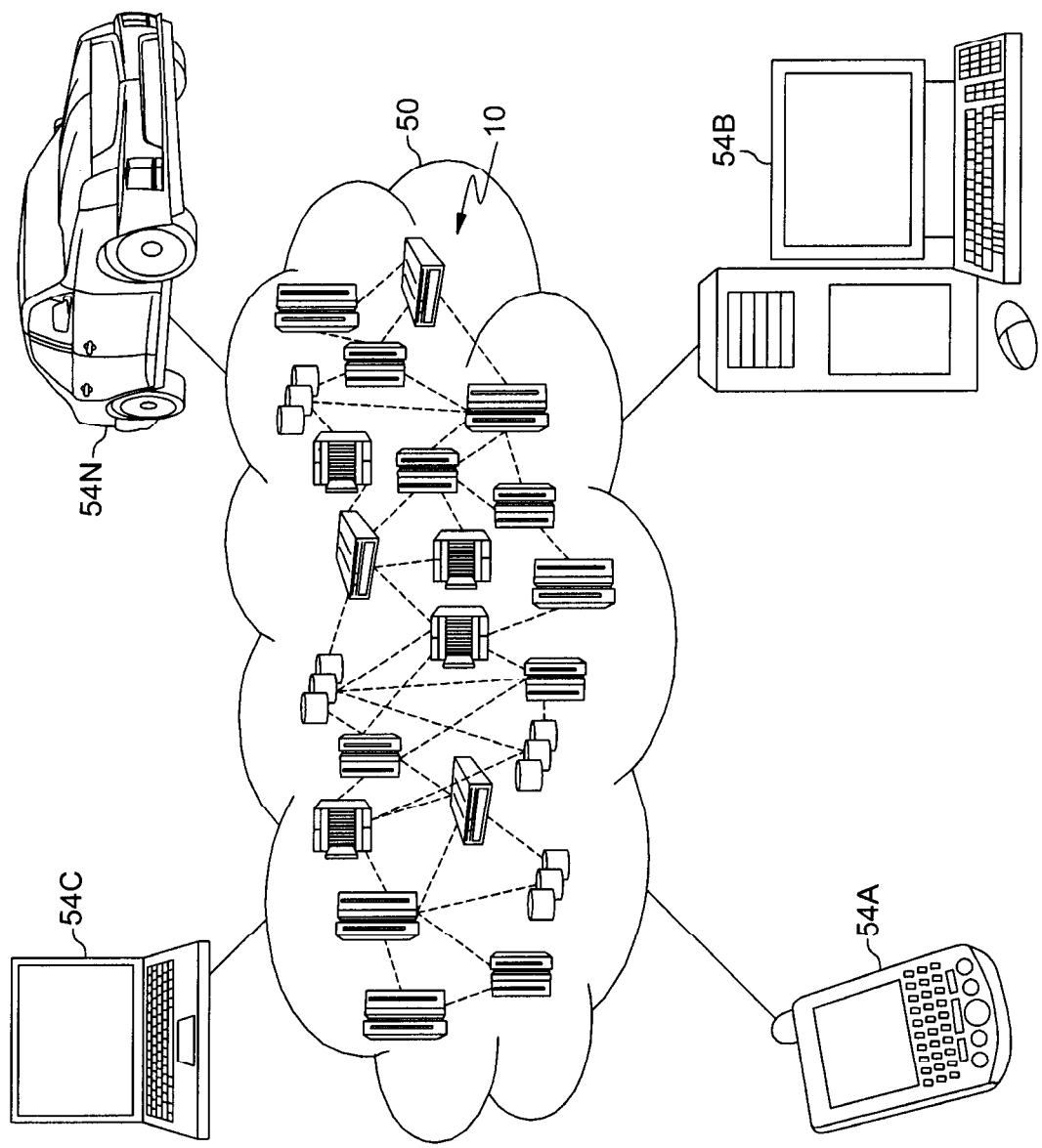
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
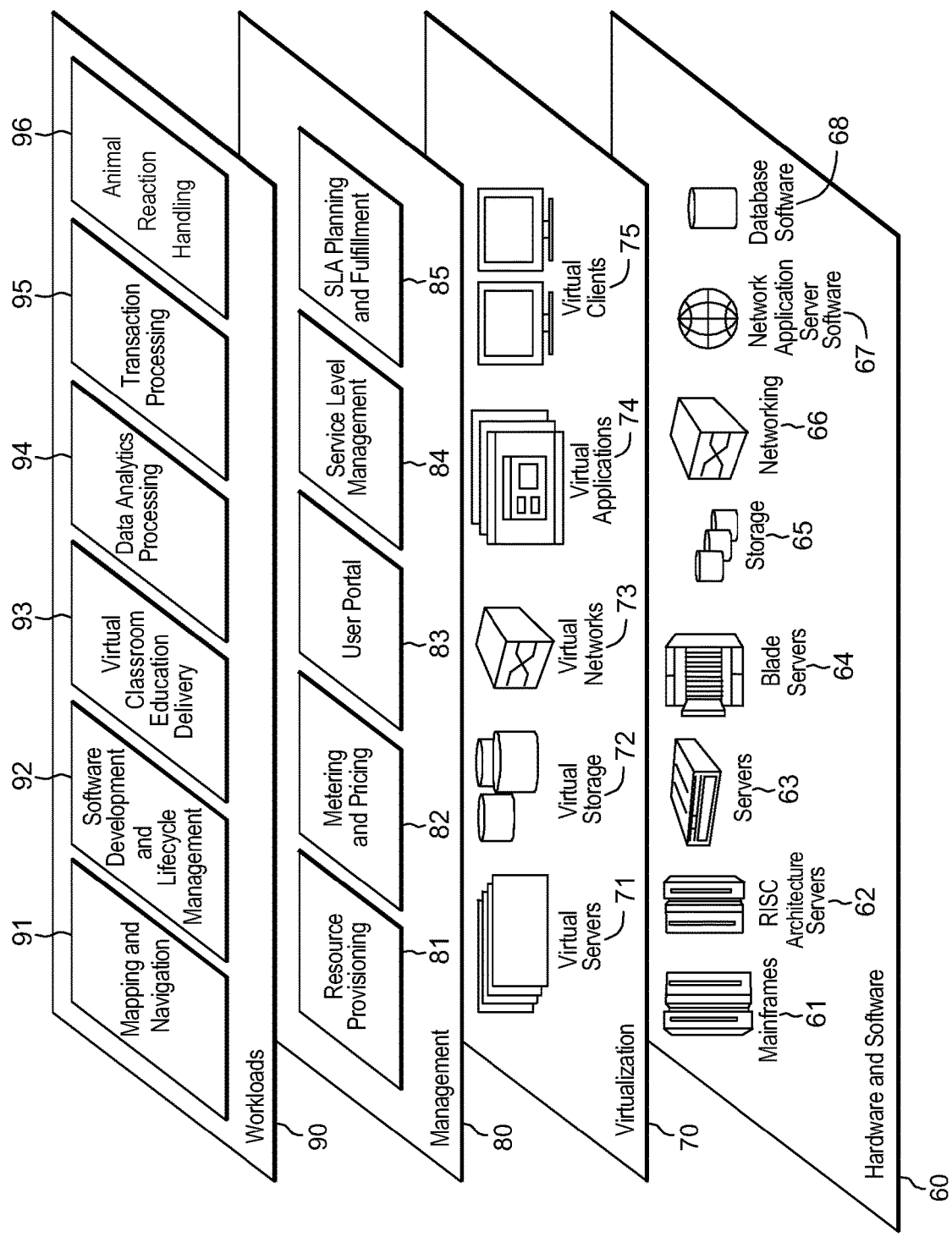
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and animal reaction handling 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
monitoring reactions of a working animal in an environment to conditions of that environment;
using an imaging device to obtain images of the environment, the images providing at least a portion of environmental data about the environment;
ascertaining, based at least in part on the environmental data, a cause of a reaction, of the monitored reactions, of the working animal;
characterizing, based on the ascertained cause of the reaction, whether the reaction of the working animal was a distraction of the working animal rather than a legitimate signal to the handler about a specific task that the working animal has been trained to provide; and
electronically signaling a handler of the working animal with an alert about the ascertained cause of the reaction of the working animal.

2. The method of claim 1, further comprising maintaining a profile of the working animal, the profile being specific to the working animal and including characteristics of the working animal that are used in the ascertaining.

3. The method of claim 2, wherein the profile indicates vocal characteristics of the working animal and image data of environmental objects with which the working animal or handler are familiar.

4. The method of claim 2, wherein the profile indicates behavioral tendencies of the working animal when the working animal encounters particular environmental objects.

5. The method of claim 2, wherein the profile comprises baseline physiological data of the working animal, and wherein the monitoring the reactions of the working animal comprises capturing physiological data of the working animal from sensors attached to the working animal, and identifying the reaction based on a comparison of the baseline physiological data to the captured physiological data.

6. The method of claim 2, further comprising building a classification model that classifies the working animal's reactions to various environmental scenarios, wherein the classification model is included in the profile.

7. The method of claim 1, wherein the characterizing characterizes the reaction of the working animal as a distraction of the working animal rather than a legitimate signal to the handler about a specific task that the working animal has been trained to provide, wherein the alert is selected to convey to the handler that the reaction of the working animal is the distraction.

8. The method of claim 1, wherein the monitoring, using, assessing, characterizing and signaling are performed during a training process to train the working animal.

9. The method of claim 1, wherein the alert is an audio alert describing the ascertained cause of the reaction.

10. The method of claim 1, wherein the alert is a tactile alert provided to the handler and indicating whether the reaction is characterized as a distraction of the working animal.

11. The method of claim 1, wherein the alert signals the handler to ignore the reaction.

12. The method of claim 1, further comprising acquiring audio from the environment and providing the audio as part of the environmental data upon which the cause of the reaction is ascertained.

13. A computer system comprising:
a memory; and
a processor in communication with the memory, wherein the computer system is configured to perform a method comprising:
monitoring reactions of a working animal in an environment to conditions of that environment;
using an imaging device to obtain images of the environment, the images providing at least a portion of environmental data about the environment;
ascertaining, based at least in part on the environmental data, a cause of a reaction, of the monitored reactions, of the working animal;
characterizing, based on the ascertained cause of the reaction, whether the reaction of the working animal was a distraction of the working animal rather than a legitimate signal to the handler about a specific task that the working animal has been trained to provide; and
electronically signaling a handler of the working animal with an alert about the ascertained cause of the reaction of the working animal.

14. The computer system of claim 13, wherein the method further comprises maintaining a profile of the working animal, the profile being specific to the working animal and including characteristics of the working animal that are used in the ascertaining.

15. The computer system of claim 14, wherein the method further comprises building a classification model that classifies the working animal's reactions to various environmental scenarios, wherein the classification model is included in the profile.

16. The computer system of claim 13, wherein the characterizing characterizes the reaction of the working animal as a distraction of the working animal rather than a legitimate signal to the handler about a specific task that the working animal has been trained to provide, wherein the alert is selected to convey to the handler that the reaction of the working animal is the distraction.

17. The computer system of claim 13, wherein the alert is a tactile alert provided to the handler and indicating whether the reaction is characterized as a distraction of the working animal.

18. A computer program product comprising:
a computer readable storage medium readable by a processing circuit and storing instructions for execution by the processing circuit for performing a method comprising:
monitoring reactions of a working animal in an environment to conditions of that environment;
using an imaging device to obtain images of the environment, the images providing at least a portion of environmental data about the environment;
ascertaining, based at least in part on the environmental data, a cause of a reaction, of the monitored reactions, of the working animal;
characterizing, based on the ascertained cause of the reaction, whether the reaction of the working animal was a distraction of the working animal rather than a legitimate signal to the handler about a specific task that the working animal has been trained to provide; and electronically signaling a handler of the working animal with an alert about the ascertained cause of the reaction of the working animal.

19. The computer program product of claim 18, wherein the method further comprises maintaining a profile of the working animal, the profile being specific to the working animal and including characteristics of the working animal that are used in the ascertaining.

20. The computer program product of claim 18, wherein the characterizing characterizes the reaction of the working animal as a distraction of the working animal rather than a legitimate signal to the handler about a specific task that the working animal has been trained to provide, wherein the alert is selected to convey to the handler that the reaction of the working animal is the distraction.

* * * * *